US008934751B2

(12) United States Patent
Simmons et al.

(10) Patent No.: US 8,934,751 B2
(45) Date of Patent: Jan. 13, 2015

(54) TELECOMMUNICATIONS CABLE INLET DEVICE

(71) Applicant: 3M Innovative Properties Company, St. Paul, MN (US)

(72) Inventors: Richard L. Simmons, Leander, TX (US); William G. Allen, Austin, TX (US); Robert W. Bunte, Georgetown, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 196 days.

(21) Appl. No.: 13/675,684

(22) Filed: Nov. 13, 2012

(65) Prior Publication Data

US 2014/0133823 A1 May 15, 2014

(51) Int. Cl.
*G02B 6/36* (2006.01)
*H02G 15/007* (2006.01)
*G02B 6/42* (2006.01)
*H02G 3/06* (2006.01)
*G02B 6/44* (2006.01)
*H02G 15/013* (2006.01)

(52) U.S. Cl.
CPC ............ *H02G 15/007* (2013.01); *G02B 6/4248* (2013.01); *H02G 3/0675* (2013.01); *G02B 6/4441* (2013.01); *H02G 15/013* (2013.01); *G02B 6/4444* (2013.01); *G02B 6/4471* (2013.01)

USPC ............................. 385/137; 385/81; 385/136

(58) Field of Classification Search
USPC ...................................... 385/77, 81, 134–137
See application file for complete search history.

(56) References Cited

U.S. PATENT DOCUMENTS

| 4,684,210 | A   | * | 8/1987  | Matsunaga et al. ............. 385/88  |
| 6,222,977 | B1  | * | 4/2001  | Kawada et al. ............... 385/136 |
| 6,269,214 | B1  | * | 7/2001  | Naudin et al. ................ 385/135 |
| 6,487,344 | B1  |   | 11/2002 | Naudin                                |
| 7,738,759 | B2  |   | 6/2010  | Parikh                                |
| 2009/0060421 | A1 |   | 3/2009 | Parikh                                |
| 2011/0033157 | A1 | * | 2/2011 | Drouard ......................... 385/77 |
| 2011/0044588 | A1 |   | 2/2011 | Larson                                |
| 2011/0075983 | A1 |   | 3/2011 | Fan                                   |

OTHER PUBLICATIONS

U.S. Appl. No. 61/718,979, filed Oct. 26, 2012, entitled "Connector for Telecommunication Enclosures".

* cited by examiner

*Primary Examiner* — Daniel Petkovsek
(74) *Attorney, Agent, or Firm* — Janet A. Kling

(57) ABSTRACT

An inlet device is described herein for inserting a telecommunication cable into a telecommunications enclosure. The inlet device includes a housing, a retainer clip attached to the housing and a compression member. The housing can include a compressible portion at the second end of the housing. The retainer clip can secure the inlet device in a close fitting port of a telecommunication enclosure.

16 Claims, 17 Drawing Sheets

TELECOMMUNICATIONS CABLE INLET DEVICE

FIELD OF THE INVENTION

The present invention relates to an inlet device for inserting a telecommunication cable containing optical fibers, copper wires or coax cable into port of a telecommunications enclosure, e.g. into a terminal closure, pre-stubbed terminal, optical network terminal or other junction box. In particular, the exemplary inlet device includes a retainer clip to secure the inlet device into said port during insertion.

BACKGROUND OF THE INVENTION

Telecommunication cables are ubiquitous and used for distributing data across vast networks. The majority of cables are electrically conductive cables (typically copper), although the use of optical fiber cables is growing rapidly in telecommunication networks as larger and larger amounts of data are transmitted.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunications enclosure to protect the exposed interior of the cable. The cable branches may be further distributed until the network reaches individual homes, businesses, offices, and so on.

Terminal enclosures are one type of telecommunications enclosure that is typically located near an end user to distribute the final service to the end user. Typical fiber terminals are designed to drop services (to provide service connections) to a small number of premises having typically between four to twelve end users. The last service connection from the fiber terminal is made to the optical network terminal (ONT), located at the end user using a drop cable. In optical fiber networks, for example, the ONT may be mounted on a wall at the end user. The ONT converts this optical signal into conventional electrical signals to provide voice (telephone), Internet (data) and video signals to the end user.

Many conventional telecommunication enclosures utilize either a mastic or rubber grommets for introducing cables into the enclosure. Conventional inlet devices are described in U.S. Pat. No. 6,487,344 and U.S. Publication No. 2009-0060421-A1 which can be inserted into a port in the wall of a telecommunications enclosure.

SUMMARY OF THE INVENTION

An inlet device is described herein for inserting a telecommunication cable into a telecommunications enclosure. The exemplary inlet device includes a housing, a retainer clip disposed in a channel that is adjacent to the first end of the housing and a compression member. The housing can include a compressible portion at the second end of the housing wherein the compression member is attached to the housing over the compressible portion. The retainer clip can secure the inlet device in a close fitting port of a telecommunication enclosure without the need of an additional locking mechanism.

In an exemplary aspect, the retainer clip includes a generally C-shaped band and at least two flange or flared portions. The flared portions can be disposed on opposite sides of the retainer clip and can extend from the band. The flange portions can be oriented at an acute angle relative a centerline of the inlet device.

In an alternative embodiment, the inlet device includes a housing, a retainer clip disposed in a channel that is adjacent to the first end of the housing and a compressive sleeve attached to the second end of the housing. Advantageously, the retainer clip can secure the inlet device in a close fitting port of a telecommunication enclosure without the need of an additional locking mechanism.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
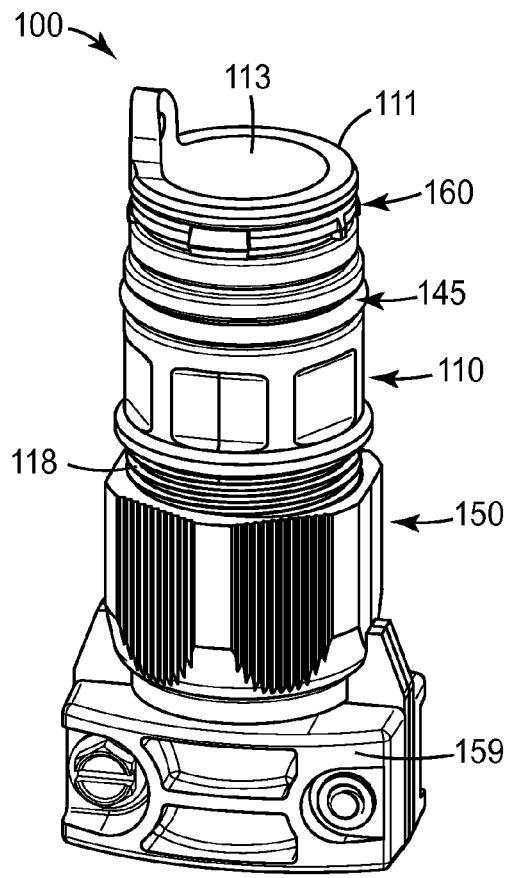
FIGS. 1A-1C show three views of an exemplary inlet device according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Exemplary embodiments herein provide an inlet device for the insertion of a telecommunication cable (e.g. an optical fiber cable, a copper cable or coax cable) into a telecommunications enclosure. Particular advantages of the design of the present inlet device include a low cost, field installable inlet device that includes an integral retainer clip. The inventive inlet device has fewer parts than some conventional inlet devices making it easier to install in the field.

The exemplary inlet device may be fitted to a communication cable(s) and inserted into a port in a telecommunication enclosure to secure the telecommunication cable in the port. Depending on the communication network architecture, the telecommunication enclosure may be a buried closure, an aerial closure or terminal, a fiber distribution hub or an optical network terminal in the outside plant or a wall mount communication box, fiber distribution hub, a wall mount patch panel, or an optical network terminal in premise applications. In one exemplary aspect, the telecommunication enclosure can be an enclosure to protect a wiring junction or transition point on a cell tower location. In particular, the exemplary cell tower enclosure can provide an interconnection platform for optical and/or electrical telecommunication cables.

In one exemplary embodiment, the communication cable can be a fiber optic cable, a low count copper cable (for communication or to supply power to equipment) disposed within the telecommunication enclosure, or a copper/fiber hybrid cable. Exemplary fiber optic cables can include distribution cables, fiber optic trunk cables and/or fiber optic drop cables. Fiber optic cable can typically include a semi-rigid outer sheath surrounding at least one optical fiber and at least one strength member. The optical fibers may be enclosed in one or more loose buffer tubes or may be provided as one or more optical fiber ribbon cables. One to twelve optical fibers may reside in the loose buffer tube surrounded by a water-blocking gel or grease. Each of the ribbon cables may have from one to about twenty-four optical fibers. Each optical fiber has a polymeric coating that surrounds and protects the glass fiber. Examples of exemplary optical fiber cables include ResiLink ADF™ All-Dielectric Flat Drop Cable available from Pirelli Cables and Systems (Columbia, N.C.) or EZ DROP cable from Draka (Claremont, N.C.), and Mini DP Flat Drop Cable available from OFS (Northcross, Ga.). The optical fiber has a polymeric coating that surrounds and protects the glass fiber. The strength members may be either semi-rigid rods or a collection of loose fibers e.g. made of aramid fibers. Exemplary fiber optic distribution or trunk cables can include ezPREP® Loose Tube Fiber Optic Cable available from Prysmian Group, Draka (Claremont, N.C.) and Fiber to the Antenna (FTTA) trunk cables available from Rosenberger Site Solutions LLC (Lake Charles, La.).

Alternatively, the telecommunication cable may be a low wire count copper cable having a semi-rigid sheath surrounding a plurality of paired copper wires or a copper coax cable. An exemplary copper cable for providing power to equipment inside of a telecommunication enclosure can include Power to the Antenna (PTTA) Power cables available from Huber+Suhner Inc. (Switzerland). An exemplary copper/fiber hybrid cable can include a 50-AC-208-8SM Remote Fiber Feeder™ Hybrid Cable with steel armor available from Alliance Corporation (Mississauga, Ontario).

Figure 1B:
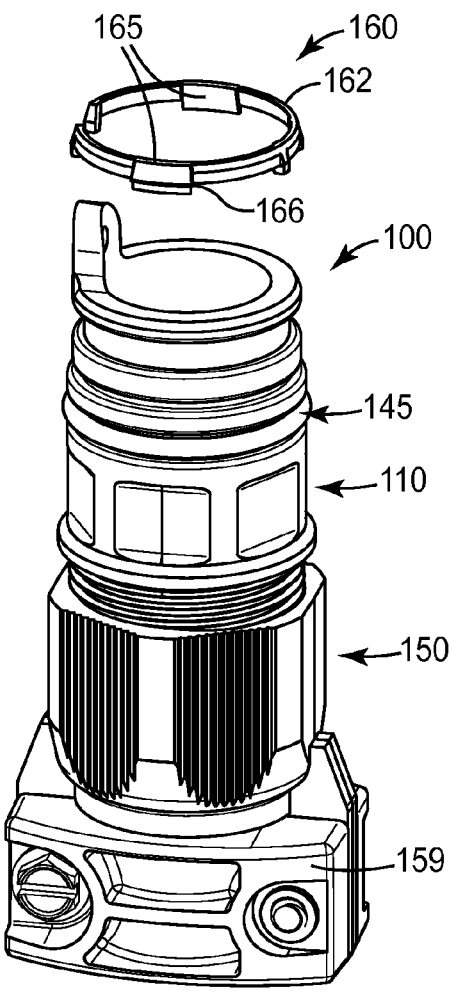
Figure 1C:
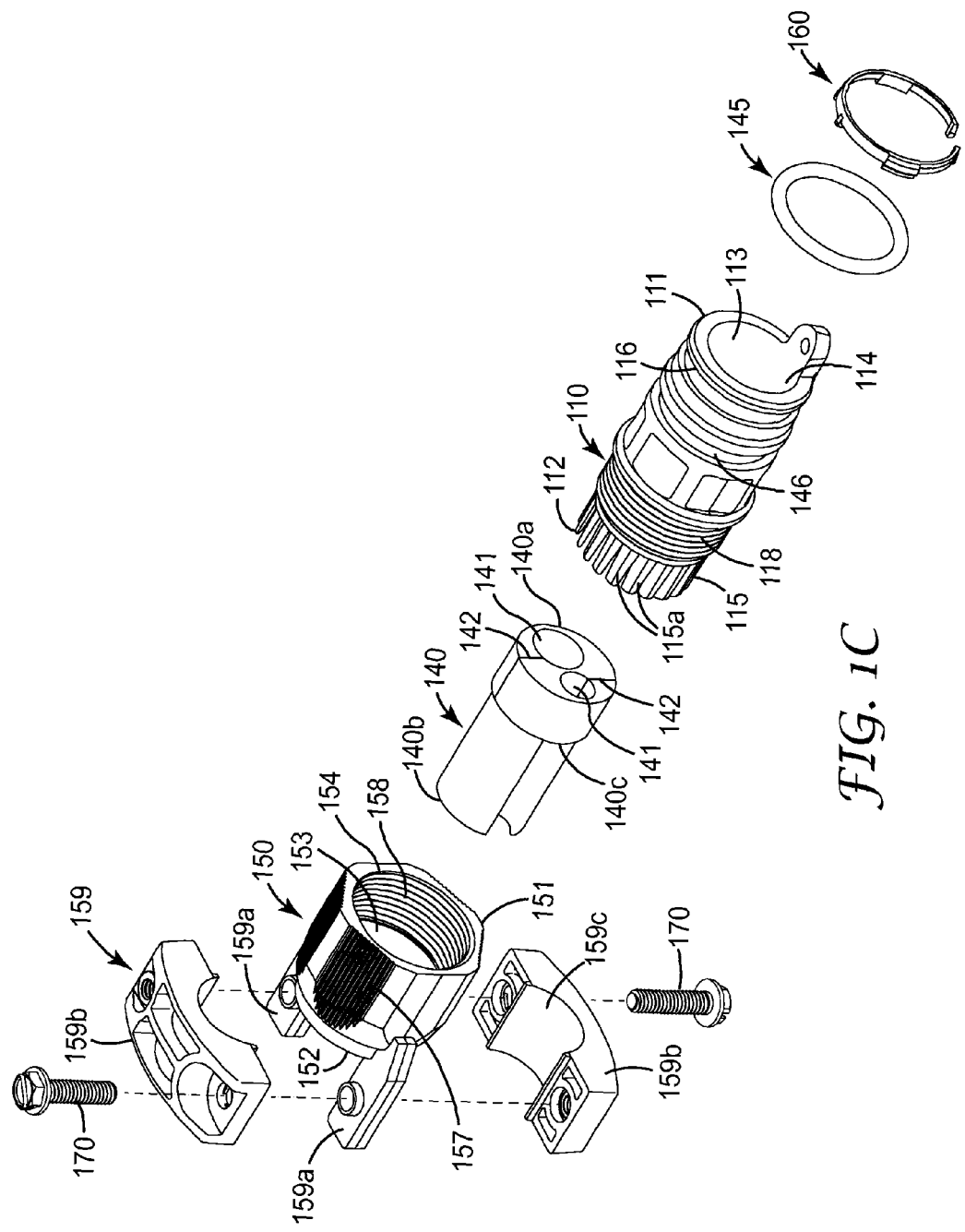

Referring to FIGS. 1A-1C, an exemplary inlet device 100 includes a housing 110 having a first end 111 and a second end 112, an internal sealing member 140 shaped to be received within the second end of the housing, and a compression member attachable to the second end of the housing. In an exemplary aspect, the compression member can be a clamping nut 150 or other device capable of applying a radial force to the second end of the inlet device housing. The inlet device 100 may be formed of plastic by conventional methods, for example by injection molding.

The housing may be generally cylindrical in shape and includes an interior passageway 113 that extends along the length of the housing from the first end 111 to the second end 112 of the housing. The housing includes a passage entry 114 at the first end 111 of the interior passageway and a passage exit (not shown) at the second end 112 of the interior passageway. Interior passageway 113 can be configured to accommodate certain categories of telecommunication cables including single fiber drop cables, multi-fiber cables, copper communication cables, power cables, hybrid copper fiber cables or coax cables.

The first end of the housing will reside inside a telecommunication enclosure when the inlet device has been fully inserted into a port of the telecommunication enclosure. The second end of the housing may be located within the port of the telecommunication enclosure when the inlet device has been fully inserted into a port of a telecommunication enclosure. Alternatively, the second end of the tubular body may extend completely through the port of the telecommunication enclosure.

A groove 146 may be disposed on the external surface of housing 110 between the first end 111 and the second end 112 of the housing to receive an external sealing member 145, such as an o-ring. This external sealing member can provide an environmental seal between the inlet device and the port of a telecommunication enclosure when the inlet device is fully seated therein.

In addition, the housing can have a channel 116 formed in the external surface of housing 110 near the first end 111 of the inlet device's housing. The channel is configured to receive a retainer clip 160 for securing the inlet device into the port of a telecommunication enclosure during insertion, thus eliminating the need for a separate locking mechanism. The retainer clip 160 can have a broken ring-shape or a C-shape and can include a plurality of flared portions 165 and a plurality of anchor protrusions 163 (shown in FIGS. 2A-2C) extending from band 162. While the exemplary retainer clip 160, disclosed herein, is shown with two flared portions, retainer clip designs having a greater number of flared portions are anticipated by the current disclosure.

Figure 2A:
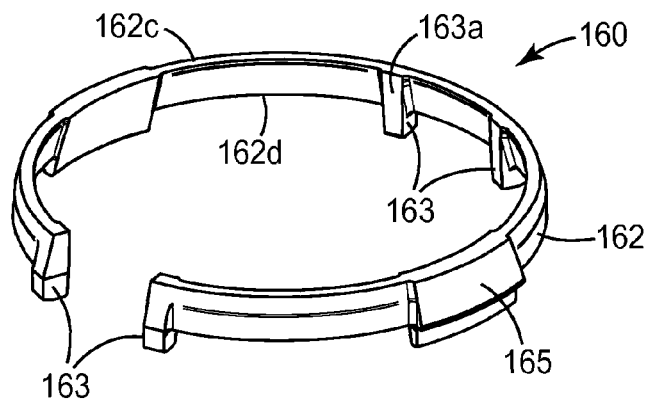
FIGS. 2A-2E show five views of a retainer clip usable with the inlet device of FIGS. 1A-1C.
Figure 2B:
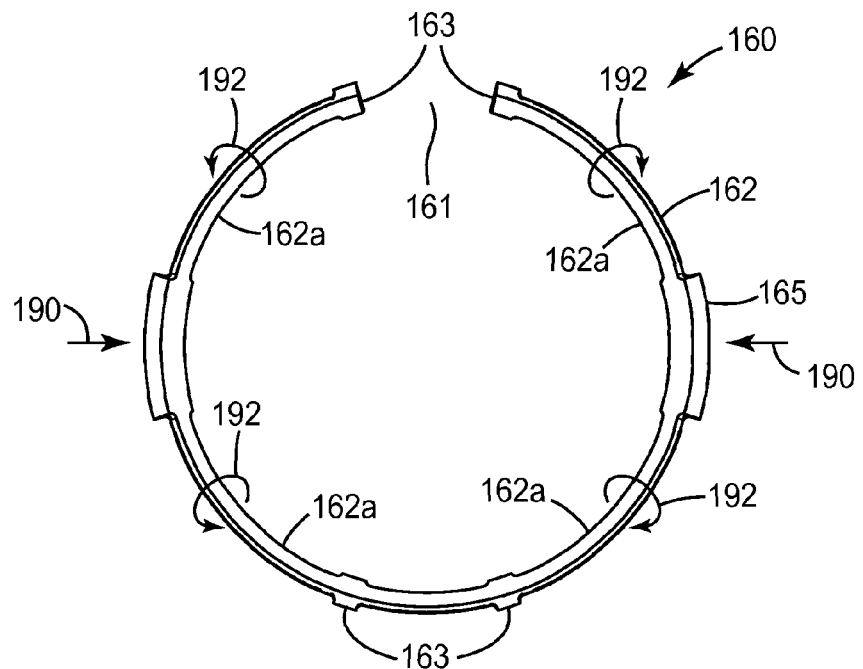
Figure 2C:
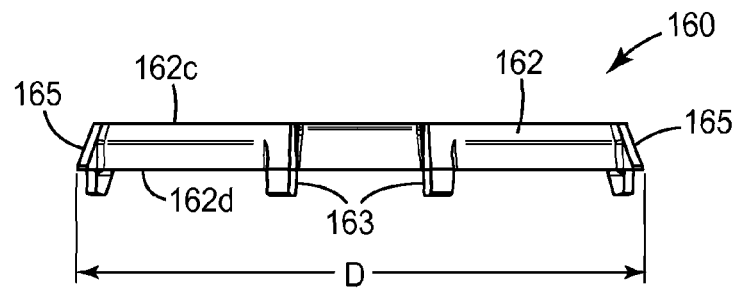
Figure 2D:
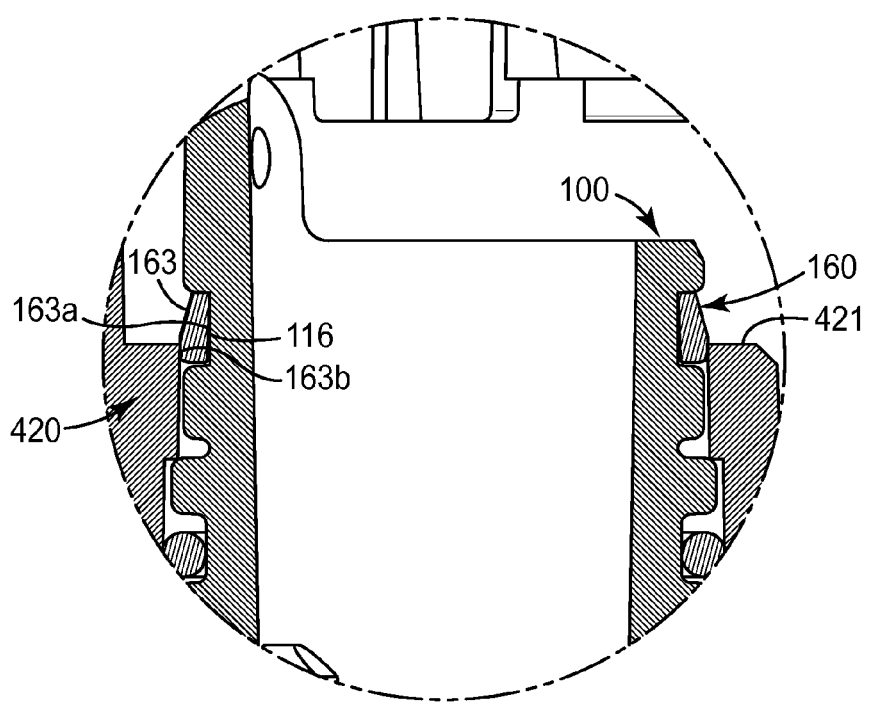

Retainer clip 160 can be seen in more detail in FIGS. 2A-2E. Anchor protrusions 163 can be disposed on either side of a break or gap 161 in band 162, as well as between flared portions 165. The anchor protrusions aid in positioning retainer clip 160 within channel 116 formed in the external surface of the inlet device as shown in FIG. 2D. The back surface 163a of each anchor portion 163 lie flush and parallel to the bottom of channel 116. A lower portion 163b of each anchor portion will remain within the port 420 of a telecommunication enclosure when the inlet device is fully seated within the port.

Band 162 can be disposed at an acute angle relative to the back surface of the anchor portions such that the top edge 162c of the band is flush with the back surface 163a of the anchor portion 163 along their top edge as shown in FIG. 2A. The bottom edge 162d of the band is offset from the back surface of the anchor portion such that the band is angularly oriented with respect to the back surface of the anchor portions. Thus, when retainer clip 160 is attached to the main body of exemplary inlet device 100 as shown in FIG. 1A, only the top edge 162c of the band will contact the bottom of channel 116, and the bottom edge 162d of the band will be offset from the bottom of the channel.

The flared portions 165 are disposed on band 162 and are also angularly disposed relative to the back surface 163a of the anchor portions 163. In an exemplary aspect, the flared portions can extend from the band and can be disposed on opposite sides of the retainer clip. The flared portions can be sized to be in a radial interference fit relative to the bore of the enclosure and are supported in this position by the band 162. In other words, the maximum diameter, D, of the retainer ring as measured from the lower outside edges of flared portions 165 is greater than the internal diameter of the port into which the exemplary inlet device is inserted.

As the inlet device 100 is inserted into the port of a telecommunication enclosure, the flared portions are forced radially inward as indicated by directional arrow 190 (FIG. 2B) to allow passage of the inlet device through the port. Since top edge 162c of band 162 bear against the bottom of channel 116, the line of contact between the top edge of the band of retainer clip and the bottom of channel serves as a pivot axis that results from the inward radial deflection of the flared portions that twists the band portions 162a of the band on either side of each flared portions, as indicated by directional arrow 192. This inward rotation relative to the pivot point is resisted by band portions 162a causing the band portions to act like torsion springs. Once the flared portions 165 clear the end of the port 424 of a telecommunication enclosure, torsion spring action forces of the band portions 162a of the band 162 on either side of each flared portions 165 push the flared portions radially outward—thus locking the inlet device 100 into the port. The anchor portions 163 mark the end of the twisting band portions 162a of the retainer clip 160.

Figure 2E:
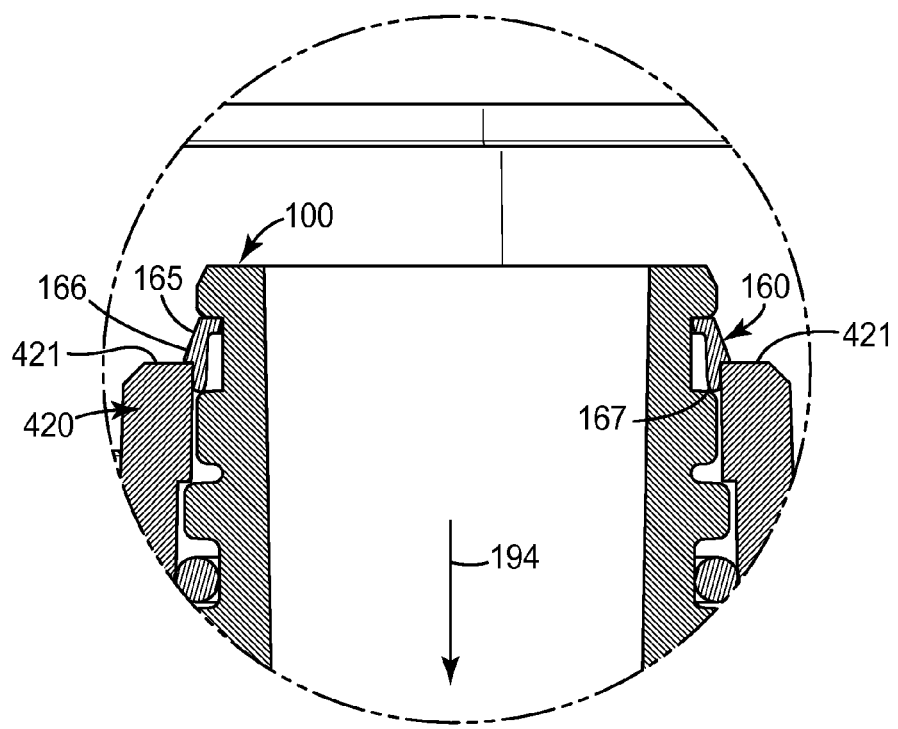

In an exemplary aspect, the flared portions 165 are longer than the width of the band and can be disposed at an angle of between about 10° and about 75° with respect to the center line of the inlet device on which the retainer clip is installed. Additionally, the distance between the bottom edges of flared portions disposed on opposite sides of the retainer clip is larger than the diameter of the portion of the inlet device housing when the flared portions are in a relaxed state, but which can also fit within channel 116 when radially deflected during installation or withdrawal of the inlet device in a port of a telecommunication enclosure so that at least a portion of the flared portions can pass through the port. In an exemplary aspect, a lower edge 167 of each flared portion 165 can remain within the port after the inlet device is fully installed into the port which can aid in the removal of the device from the port as shown in FIG. 2E. Each flared portion 165 can include a lip 166 that engages with an edge 421 of a port 420 in the telecommunication enclosure to prevent extraction of the inlet device by application of a simple removal force indicated by directional arrow 194 which may arise due to an attempt to remove the device from the port without using an appropriate tool or by a force exerted on the cable passing through the exemplary inlet device.

The housing 110 can have an external threaded portion 118 located between groove 146 and the second end 112 of the housing 110. The external threaded portion 118 cooperates with a corresponding internal threaded portion 158 (see e.g., FIG. 1C) of a the clamping nut 150 to cause a compressible portion 115 of the housing 110 to conform to an outer surface of the communication cable or the outer surface of an optional internal sealing member 140 fitted in the inlet device.

The compressible portion 115 is formed at the second end 112 of the housing. The compressible portion 115 may be reduced in size (diameter) when an external radial force is exerted on it such as by application of a clamping nut 150 or a cable securing device 160. The compressible portion 115 centers the telecommunication cable in the inlet device 100 when the inlet device is installed on the telecommunication cable. The compressible portion 115 may include a plurality of spaced apart flexible fingers 115a which surround the passage exit. The fingers 115a may be squeezed together when clamping nut 150 is attached to the second end of the housing.

An internal sealing member 140 may be fitted into the interior passageway 113 in the compressible portion 115 of the housing 110 to improve the sealing capability of the inlet device around a telecommunication cable. The internal sealing member can have one or more bores 141 extending there through to accommodate telecommunication cables. In one exemplary aspect, the internal sealing member can have a slit 142 extending from the outside surface of the sealing member into each bore to allow installation of telecommunication cables without having to thread them through the bores. The internal sealing member can have a constant outer diameter or it can have a stepped outer diameter as shown in FIG. 1C. In FIG. 1C, internal sealing member 140 has a first diameter at the first end 140a, a second diameter at the second end 140b of the internal sealing member, and a step transition 140c between the first and second ends. In an exemplary aspect, the stepped external profile can allow the second end of the internal sealing member to extend through compression nut 150 enabling a longer internal sealing member to be used which can help strain relieve the telecommunication cable(s) exiting the second end of the inlet device. The number, size and shape of the bores through the internal sealing member can be altered to accommodate different cable geometries.

The exemplary internal sealing member 140 may be formed from, for example, elastomeric and polymeric materials, such as thermoplastic elastomers, vulcanite rubbers, polyurethane foams, reactive and non-reactive polymers, and soft plastics, to name a few. Material selection will depend upon factors including, but not limited to, material durometer, chemical and environmental exposure conditions including temperature and humidity conditions, and flame-retardancy requirements, to name a few.

The telecommunication cable can be passed through the internal sealing member 150 when the cable is installed into inlet device 100. The tightening of the clamping nut over the collapsible portion of the housing compresses the internal sealing member. In some applications such as in premise installations, a lesser degree of environmental protection is required and the internal sealing member 140 may be omitted. In this case, the compressible portion of the housing directly grips the cable inserted therethrough.

FIGS. 1A-1C illustrate an exemplary cable clamping nut 150. The cable clamping nut has an interior chamber 153 extending between the first side 151 and a second side 152. The interior chamber 153 has a first opening 154 at the first side 151 to accept the second end 112 of housing 110 (FIG. 1A). The chamber 153 has a smaller second opening (not shown) at the second side 152 of cable clamping nut 150 to accommodate the passage of a telecommunication cable therethrough. The chamber 153 has an internal threaded portion 158 that can correspond to the external thread 118 on the second end of the housing and/or the second end of the cable securing device to allow the cable clamping nut to be secured to the housing and/or the cable securing device.

In an exemplary embodiment, cable clamping nut 150 can have a gripping surface 157 on the external surface of the cable clamping nut that corresponds to the position of the internal threaded portion 158. The external gripping surface may be a hexagonally shaped cross-section as shown in FIG. 1C to facilitate gripping of the cable securing device with a tool or by hand. The external gripping surface can have other geometric configurations such as a circular cross-section, a rectangular cross-section or other polygonal cross-section.

Additionally, the gripping surface may be textured (e.g. a ridged or cross-hatched texture) to further facilitate gripping of the cable securing device.

The cable clamping nut 150 includes a retention clamp 159 disposed on the second end 152 of cable clamping nut 150 to securely hold the telecommunication cable. Two longitudinal side tabs 159*a* project from the second end 152 of clamping nut 150. Two halves 159*b* of retaining clamp 159 may be secured to the longitudinal side tabs by conventional mechanical fasteners 170 such as by screws or rivets. The interior surface 159*c* of the two clamp halves may be concave and can be smooth or can have ridges or barbs to bite into the sheath of the telecommunication cable to further securely grip the telecommunications cable when it is installed into an exemplary inlet device. In an alternative embodiment, one of the halves of the retention clamp may be integrally formed with the longitudinal side tabs to reduce the number of parts required.

At each point where a telecommunication cable is opened, a telecommunications enclosure can be provided to protect the exposed interior of the cable. Telecommunications enclosures can be designed to provide service connections to a number of homes or businesses or can be used in fiber to the antenna installations in a wireless network.

Figure 3:
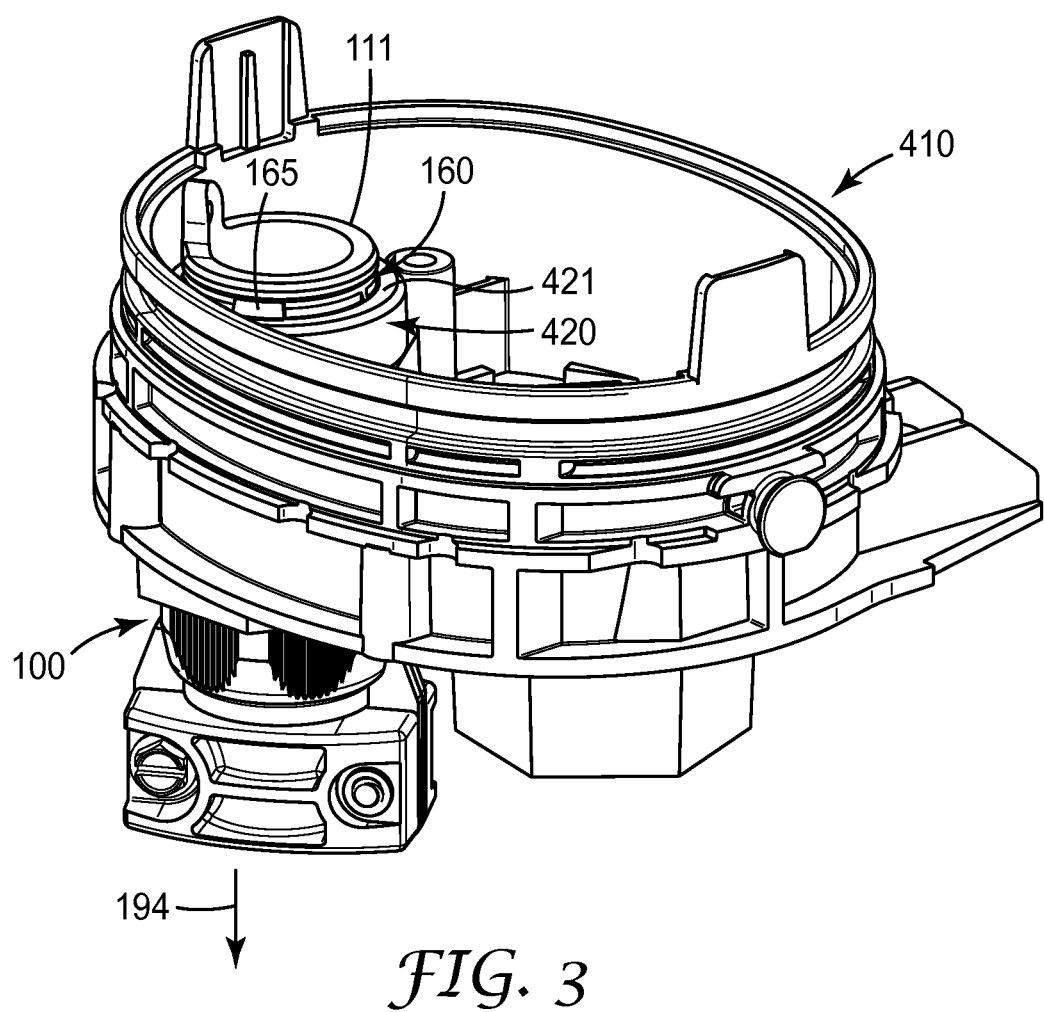
FIG. 3 is an isometric view showing the exemplary inlet device of FIGS. 1A-1C inserted into a base portion of a telecommunication enclosure.

An exemplary telecommunications enclosure, according to one embodiment of the invention is illustrated in FIG. 3, includes a base 410 and a cover or housing (not shown) removeably securable to the base. The base 410 includes at least one port 420 for receiving an inlet device 100. The base may have one, two, or any other number ports 420 as is required for a particular telecommunications enclosure. The cover may be secured to the base 410 by a bail, clamps or other mechanical fastening method. When engaged, the base and cover provide protection for the internal components of the enclosure from weather, insects and other external hazards.

FIG. 3 shows an interior view of the base 410 of a telecommunication enclosure, where the flared portion 165 of the retainer clip 160 of inlet device 100 are engaged with an edge 421 of a port 420 in the base 410 of a telecommunication enclosure to prevent removal of the inlet device from the port by the application of a withdrawal force, represented by directional arrow 194, exerted on the inlet device or on the telecommunication cable that is disposed in the inlet device. In an exemplary aspect, the retainer clip can withstand a removal force in excess of about 100 lb$_f$ being exerted on the inlet device or on the telecommunication cable that is disposed in the inlet device.

While FIG. 3 shows the exemplary inlet device disposed in a port 420 in a base 410 of a dome style telecommunication enclosure (cover is not shown), use of said inlet device in the end wall or end seal of an in-line telecommunication enclosure or in a port disposed in a wall of an outside plant enclosure including a network interface device, an exterior wall mount box or a telecommunications cabinet, is considered to be within the scope of the current disclosure. In addition, the exemplary inlet device with an optional internal sealing member can be used in in-building enclosures as well.

FIGS. 4A-4E are a series of cross-sectional views showing the insertion of exemplary inlet device 100 into a port 420 in the base 410 of a telecommunication enclosure. Port 420 can include an interior sleeve portion 420*a* and an exterior sleeve portion 420*b* having a bore 422 extending therethrough, and shown in FIG. 4A. The interior sleeve portion will be disposed inside of the telecommunication enclosure once sealed, while the exterior sleeve portion will remain outside of the telecommunication enclosure. In an alternative embodiment, the sleeve portion of the port can be disposed predominately inside the enclosure or outside of the enclosure as a matter of design choice.

The bore 422 through the sleeve portion(s) 420*a*, 420*b* of port 420 can have a stepped profile having a wide entrance portion in the exterior sleeve portion 420*b* and a narrower exit portion disposed in the interior sleeve portion 420*a*. The wider entrance portion facilitates alignment of the inlet device with the port facilitating insertion. The narrower exit portion can include a ledge 423 which limits the distance into the enclosure that the inlet device can travel. An intermediate wall 424 can extend below ledge 423 of the interior sleeve which is at an intermediate width between the wide entrance portion and the narrower exit portion. This section of the interior sleeve helps with fine alignment of the inlet device in the port as well as providing a sealing interface between the external sealing member 145 of inlet device 100 in the port 420 of the telecommunication enclosure.

Figure 4A:
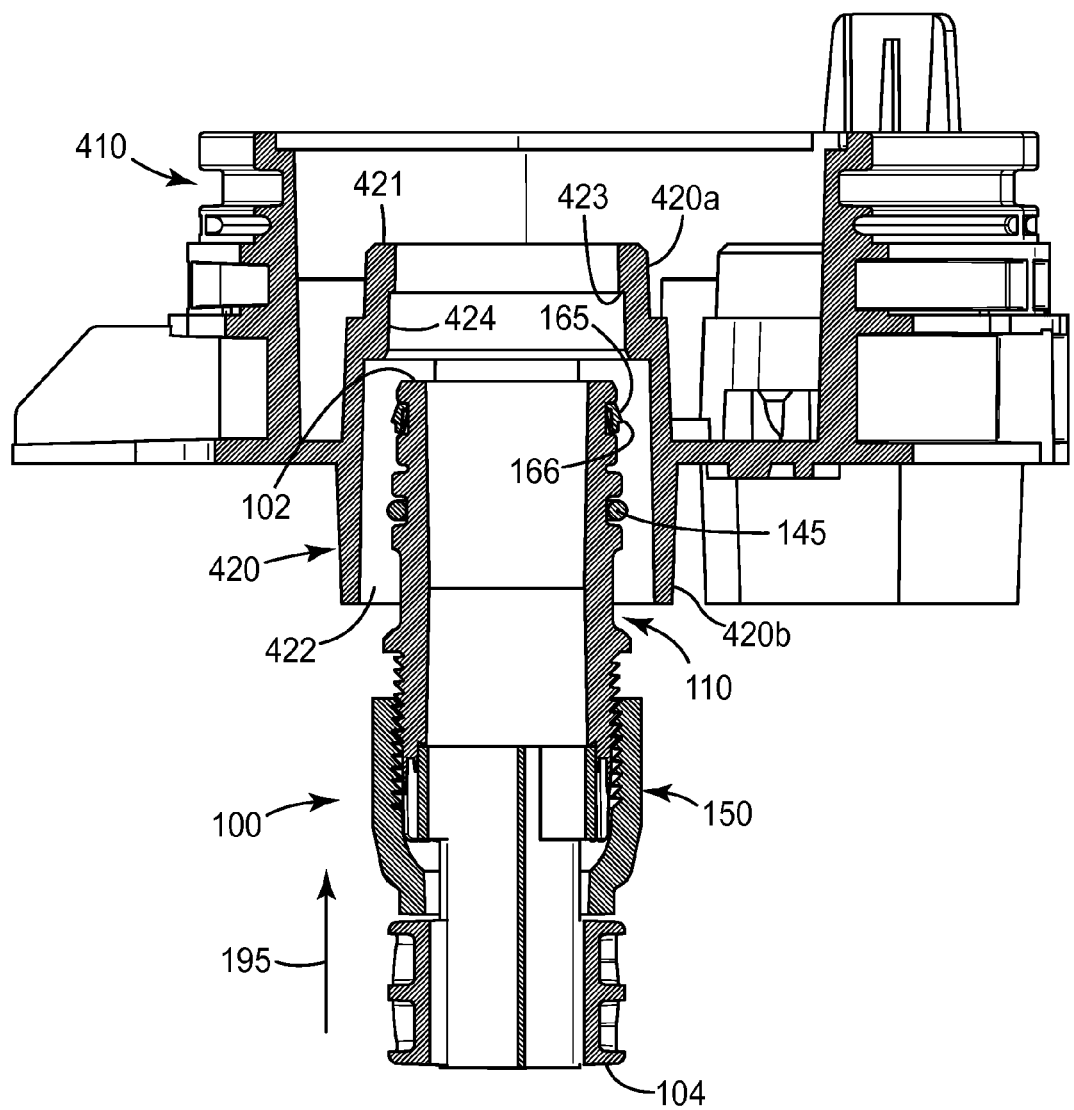
FIGS. 4A-4E show the installation of the exemplary inlet device of FIGS. 1A-1C into a port of a base portion of a telecommunication enclosure.
Figure 4B:
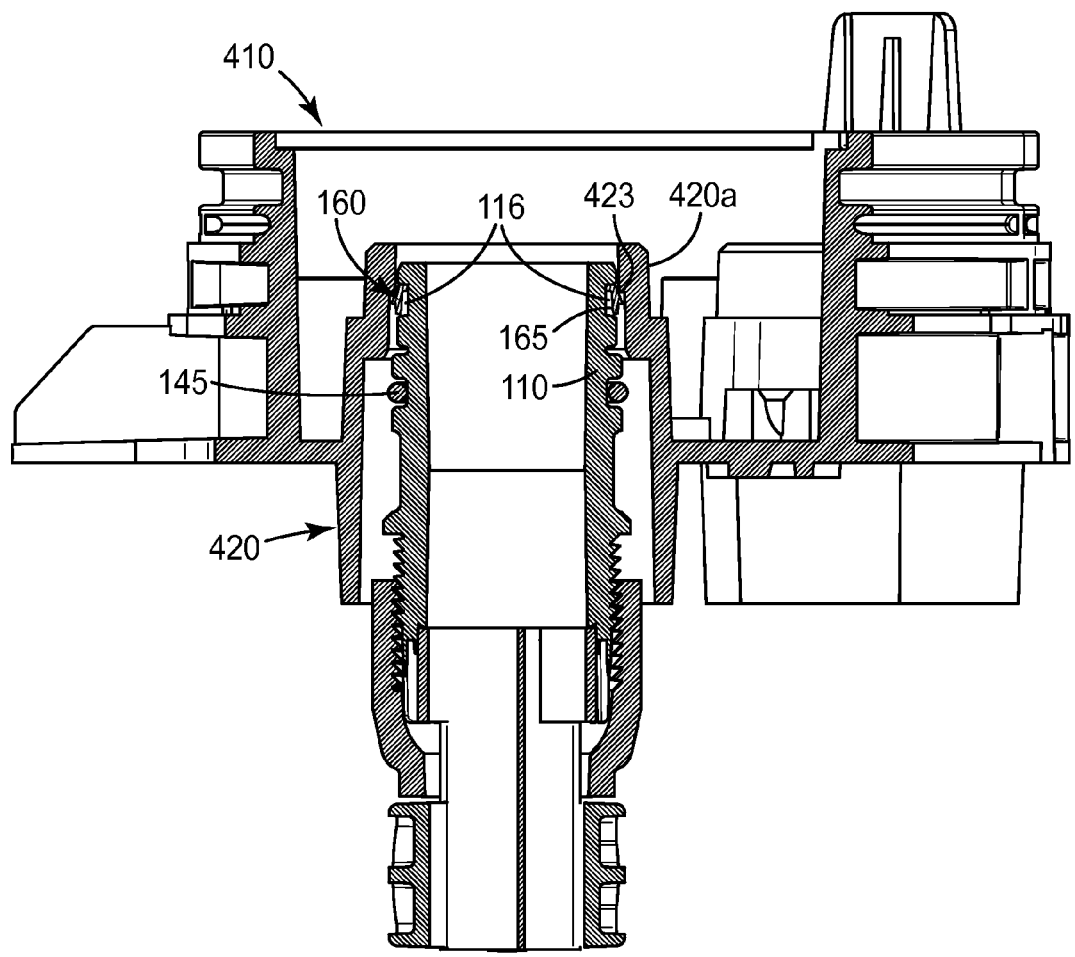
Figure 4C:
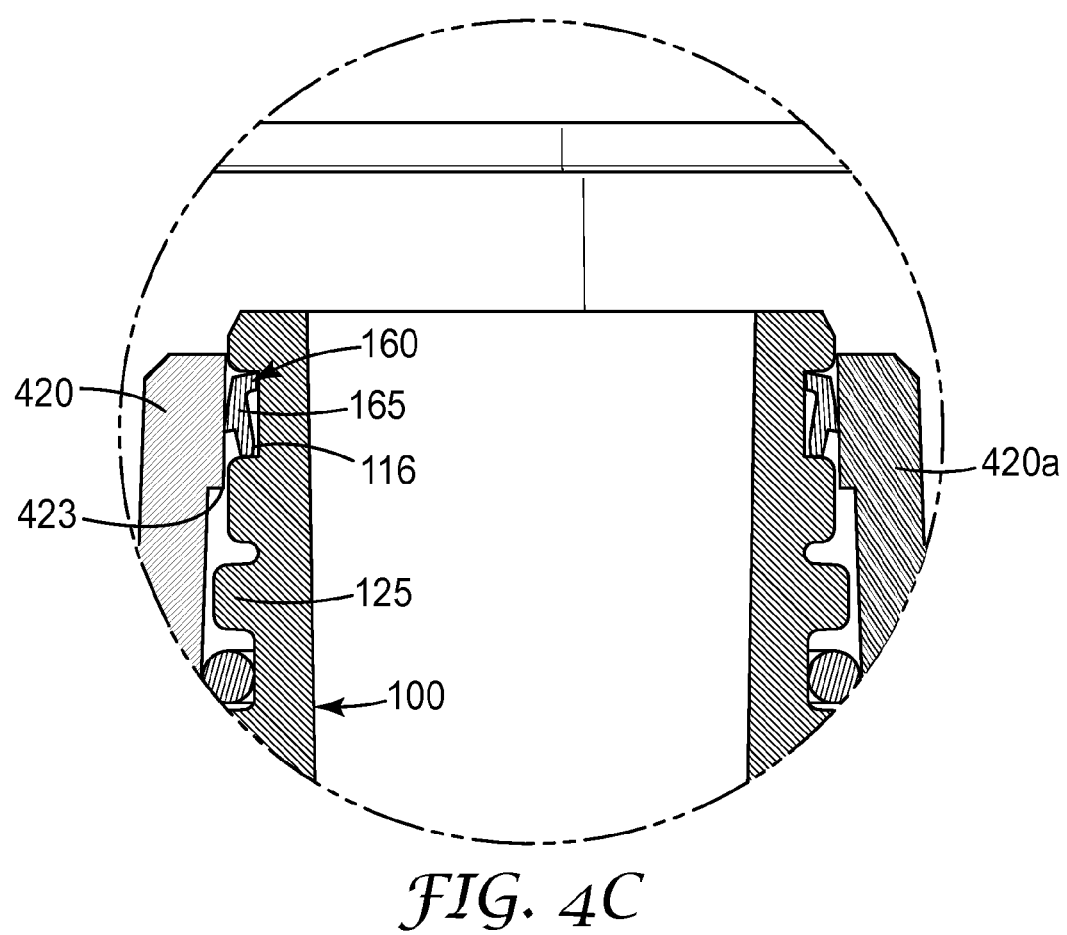
Figure 4D:
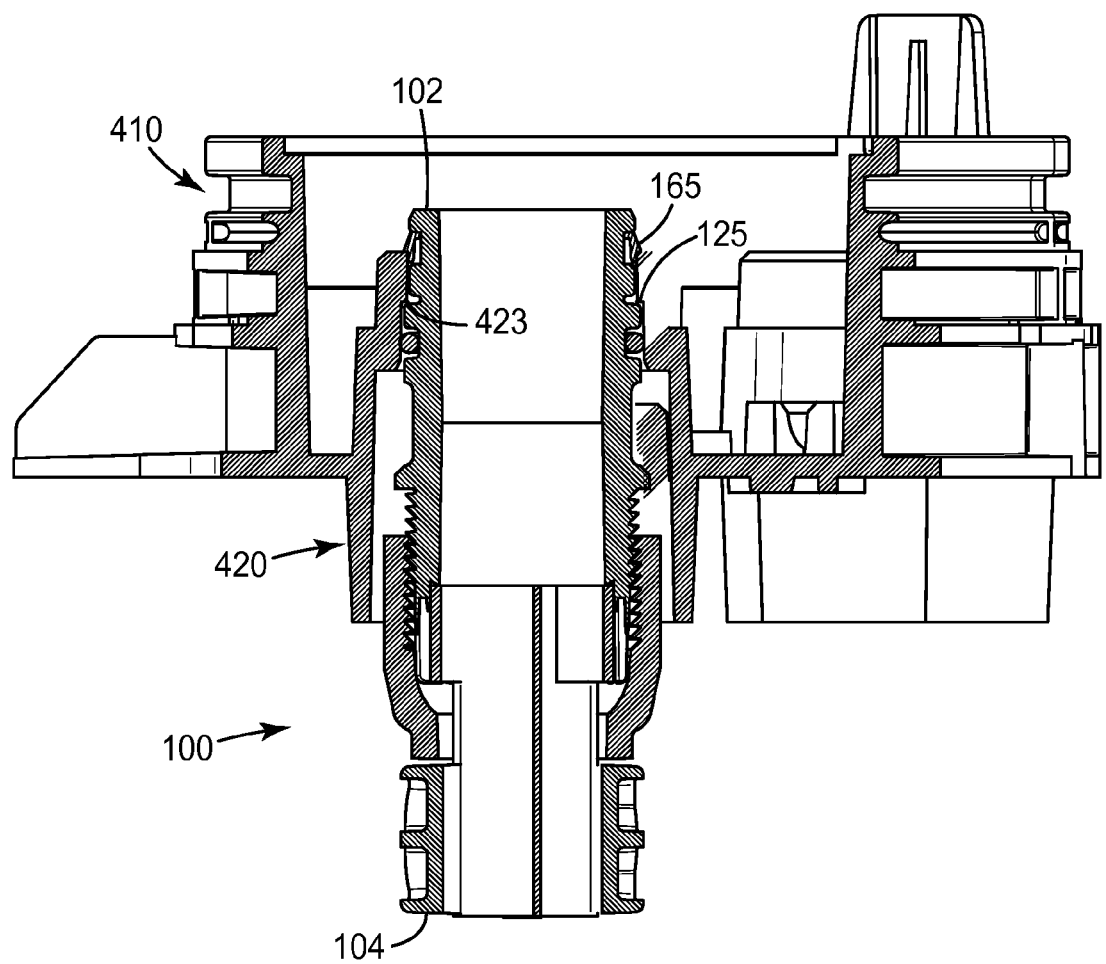
Figure 4E:
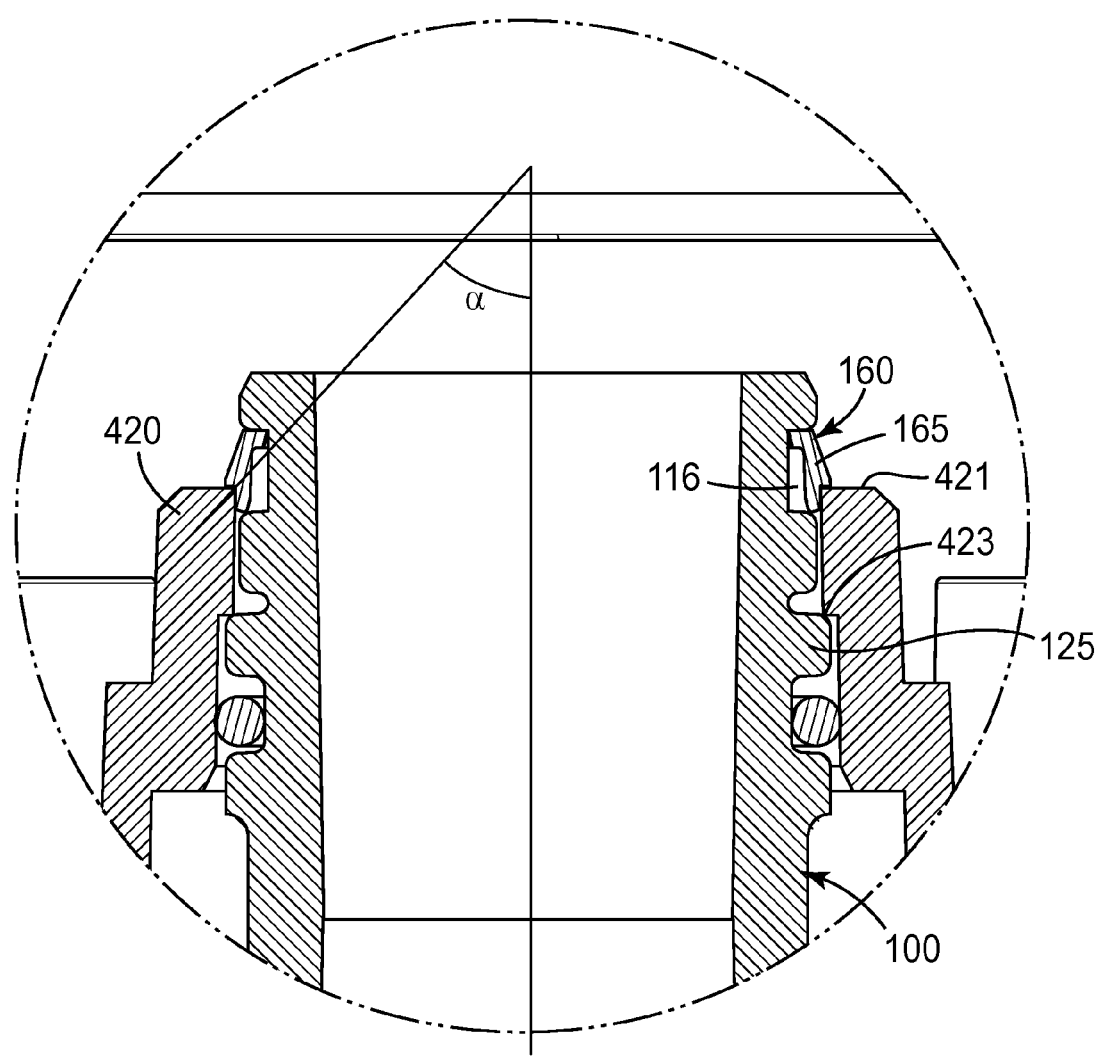

FIG. 4A, shows inlet device 100 inserted into the exterior sleeve 420*b* of port 420. The inlet is pushed further into port 420 in the direction indicated by arrow 195 until the flared portion 165 of the retainer clip 160 engages with ledge 423 of the narrow exit portion of the interior sleeve 420*a* of port 420 as shown in FIG. 4B. FIG. 4C is a close-up view showing the inlet device 100 as it is moved further into the port 420 of the telecommunication enclosure, the flared portions 165 of the retainer clip 160 are radially deflected into channel 116 of the inlet device to allow the inlet device to pass through the narrow exit portion of the interior sleeve 420*a* of the port. Forward movement of the inlet device 100 stops when an abutment structure 125 protruding from the exterior surface of the inlet device engages with a ledge 423 located within the port 420 as shown in FIG. 4D. In this configuration, at least a portion of flared portion 165 has exited the port allowing the flared portion to move outwards as a result of the torsion spring forces stored in retainer clip 160 during the initial radial deflection of the flared portions. The flared portions can engage with an edge 421 of a port 420 in the base 410 of the telecommunication enclosure. The interaction of the flared portions of the retainer clip 160 with the edge of the port prevent removal of the inlet device from the port by the application of a removal force exerted on the inlet device or on the telecommunication cable that is disposed within the inlet device. FIG. 4E shows an example of the flared portion 165 fully supporting the inlet device 100 against pullout in port 420. The flared portions are disposed at an angle, α, relative to the center line of the inlet device. The angle, α, can be between about 10° and about 70°. In an exemplary aspect, the angle, α, can be about 34°.

Once the exemplary inlet device 100 is fully seated in port 420, the first end 102 of inlet device will be disposed inside of the telecommunication enclosure and the second end 104 of the inlet device will remain outside of the telecommunication enclosure as shown in FIG. 4D.

Figure 5A:
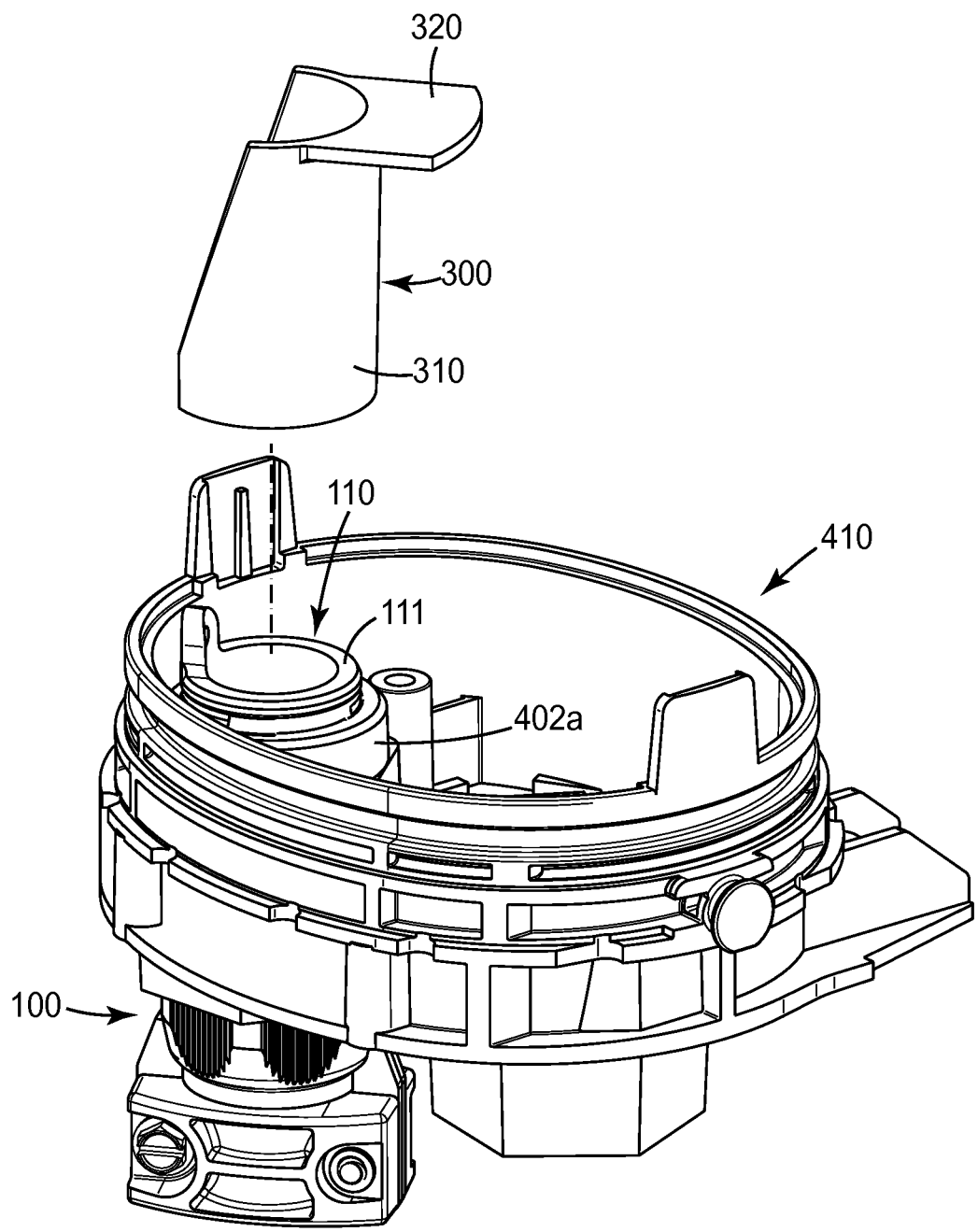
FIGS. 5A-5C show the removal procedure for the exemplary inlet device of FIGS. 1A-1C from a port in a base portion of a telecommunication enclosure
Figure 5B:
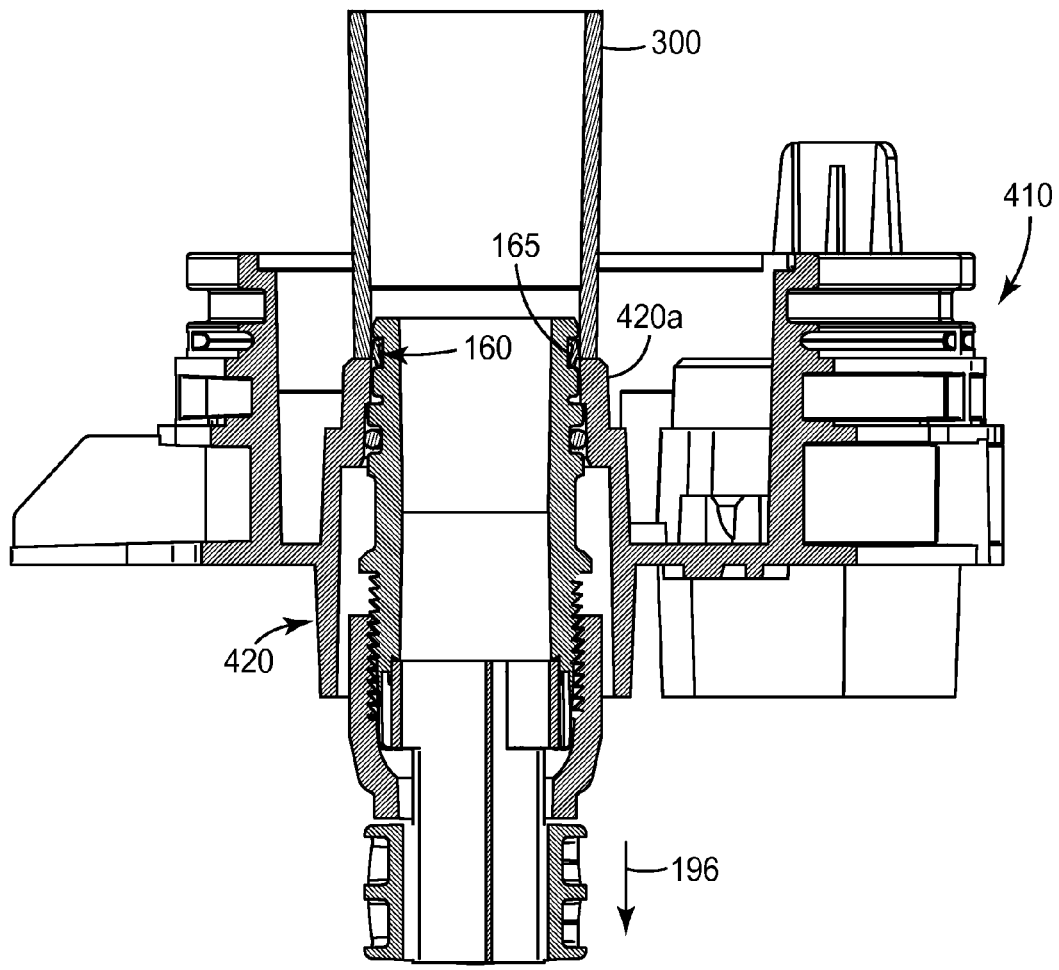
Figure 5C:
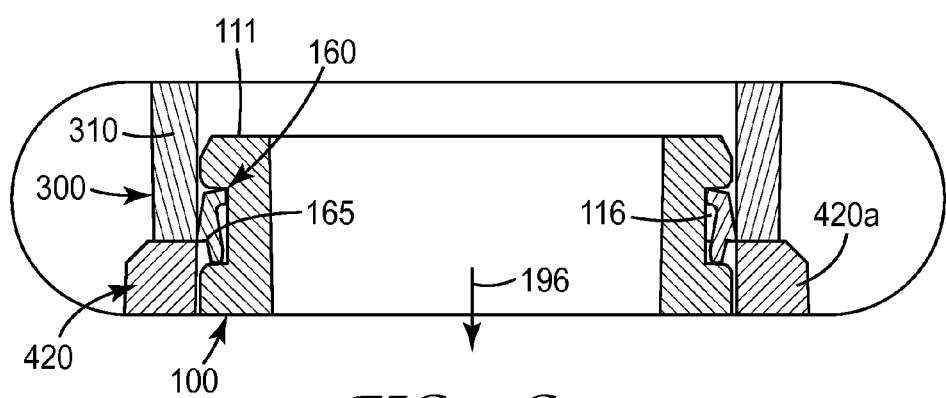

An extraction tool 300, shown in FIGS. 5A-5C can be used to depress flared portion 165 of the retainer clip 160 so that they pass back through the port enabling the extraction of inlet device 100. The extraction tool can have a semi-cylindrical tubular body 310 wherein the internal diameter of the semi-cylindrical tubular body is less than or equal to the internal diameter of the narrow exit portion of the interior sleeve 420*a* of port 420 and a handle 320 extending from the semi-cylindrical tubular body to facilitate handling of the extraction tool. The extraction tools can be slideably engaged with the first end 111 of the inlet device housing 110 to depress flared portions 165 of the retainer clip 160 into the channel 116 that holds the retainer clip, thus allowing extraction of the inlet device 100, in a direction indicated by arrow 196, from port 420 in the base of the telecommunication enclosure.

Figure 6:
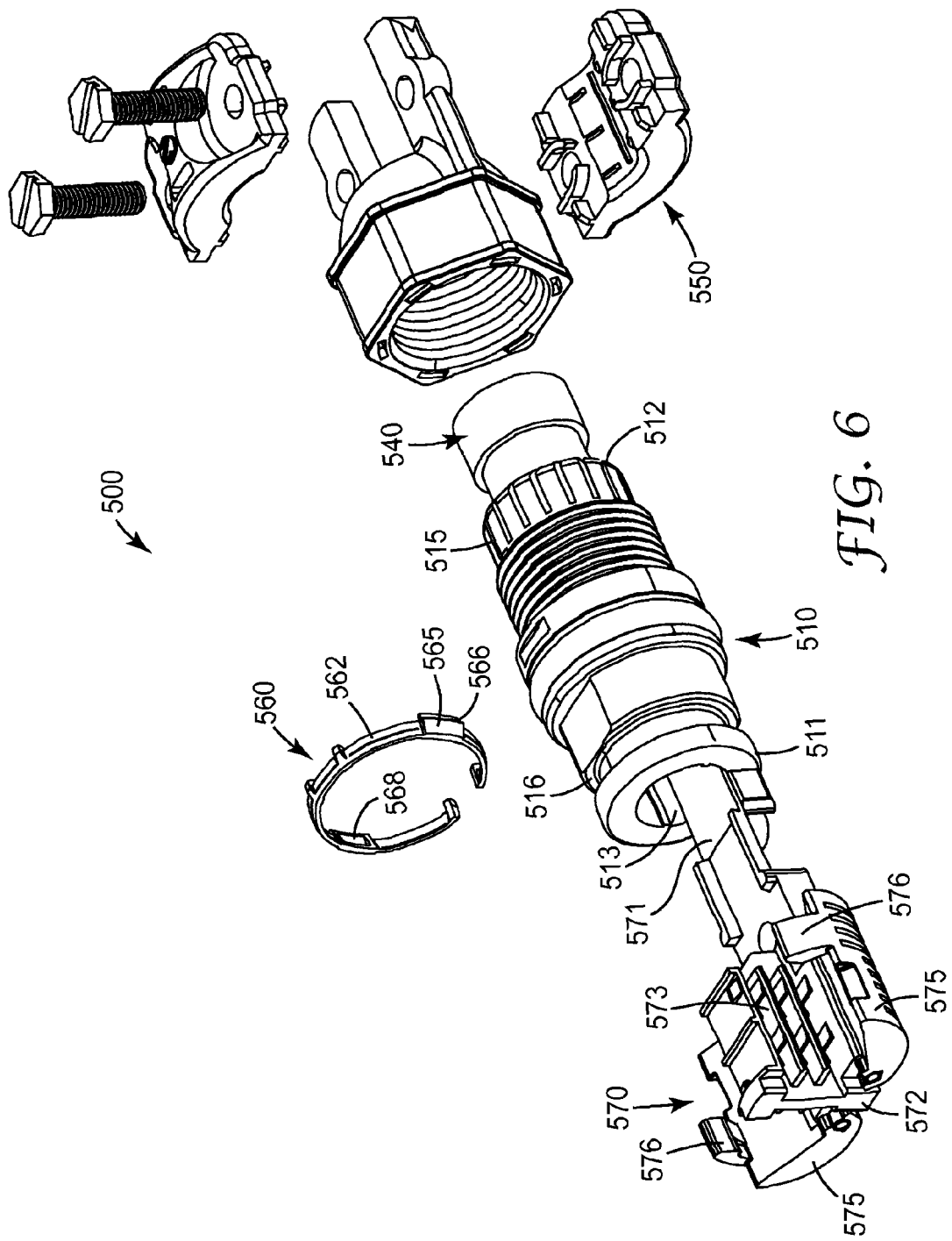
FIG. 6 is an isometric view showing another exemplary inlet device according to an aspect of the present invention.

FIG. 6 is an exploded view of a second embodiment of an exemplary inlet device 500 that includes the novel retainer clip 560 of the present invention. Inlet device 500 is similar to the inlet device described in U.S. Patent Publication No. 2011-0075983, which is incorporated by reference herein, in its entirety. An inlet device 500 is designed to accommodate the insertion of a plurality of telecommunication cables into a telecommunications enclosure through a single entrance port.

Inlet device 500 includes a housing 510, a cable retention device 570, an internal sealing device 540, and a compression member 550. Housing 510 has a first end 511 and a second end 512, wherein the housing includes a compressible portion 515 at the second end of the housing and the cable retention device may be secured to the first end of the housing. Compression member 550, which is similar to retention member 150 described previously, may be fitted over the compressible portion at the second end of the housing.

Housing 510 have a channel 516 formed in the external surface of housing 510 near the first end 511 of the inlet device 500. The channel is configured to receive a retainer clip 560 for securing the inlet device into the port of a telecommunication enclosure during insertion, thus eliminating the need for a separate locking mechanism. The retainer clip 560 can have a broken ring-shape or a C-shape and include a plurality of flared portions 565 disposed on band portion 562. The flared portions can be compressed during insertion of the inlet device through the port but which cant outward as soon as the retainer clip emerges from within the port as a result of the torsional spring force stored in the retainer clip when the flared portions of the retainer clip are radially depressed. In an exemplary aspect, the flared portions 565 can include a recess or divot 568 disposed in their back side to facilitate molding of the retainer clip without negatively affecting the performance of the retainer clip.

In an exemplary aspect, the flared portions 565 can be longer than the width of the band and be disposed at an angle of between about 10° and about 70° relative to the centerline of the inlet device such that the distance between the bottom edges of flared portions disposed on opposite sides of the retainer clip is larger than the diameter of the portion of the inlet device housing that passes completely through the port and the exit opening of the port through which the first end of the inlet device emerges during installation of the inlet device into the port of a telecommunication enclosure. The flared portions can include a lip 566 that engages with an edge of a port in the telecommunication enclosure containing one or more ports to prevent extraction of the inlet device by application of a simple removal force.

Cable retention device 570 includes a rack 572 for securing a plurality of telecommunication cables 50 to the inlet device. In an exemplary embodiment, a plurality of fiber optic drop cables, such as FRP drop cables may be fitted into a corresponding number of compartments 573 within the rack of cable retention device. Each compartment 573 may be separated from each adjacent compartment. The rack can include one or more teeth within each compartment to bite into the outer sheath of any telecommunication cable contained therein to hold it firmly within a given compartment against an axial load placed on the cable.

Additionally, the retention device 570 may have at least one clamping member 575 to assist in retaining the cables within the compartments of rack 572. FIG. 6 shows a cable retention device having two clamping members 575 which are hingedly attached to the rack. Each clamping member has a resilient latch 576 extending from an edge of the clamping member opposite the hinge attaching the clamping member to the base to lock the clamping members in a closed position to prevent telecommunication cables contained in each compartment from slipping laterally out of the compartment.

Cable retention device 570 can be secured to the first end 511 of the housing 510 by inserting a tongue 571 on the cable retention device 570 into the passage entry 513 of the housing 510.

Internal sealing member 540 can have a plurality of openings extending therethrough. In an exemplary aspect, the internal sealing member will have the same number of openings as there are compartments in rack 570.

Figure 7:
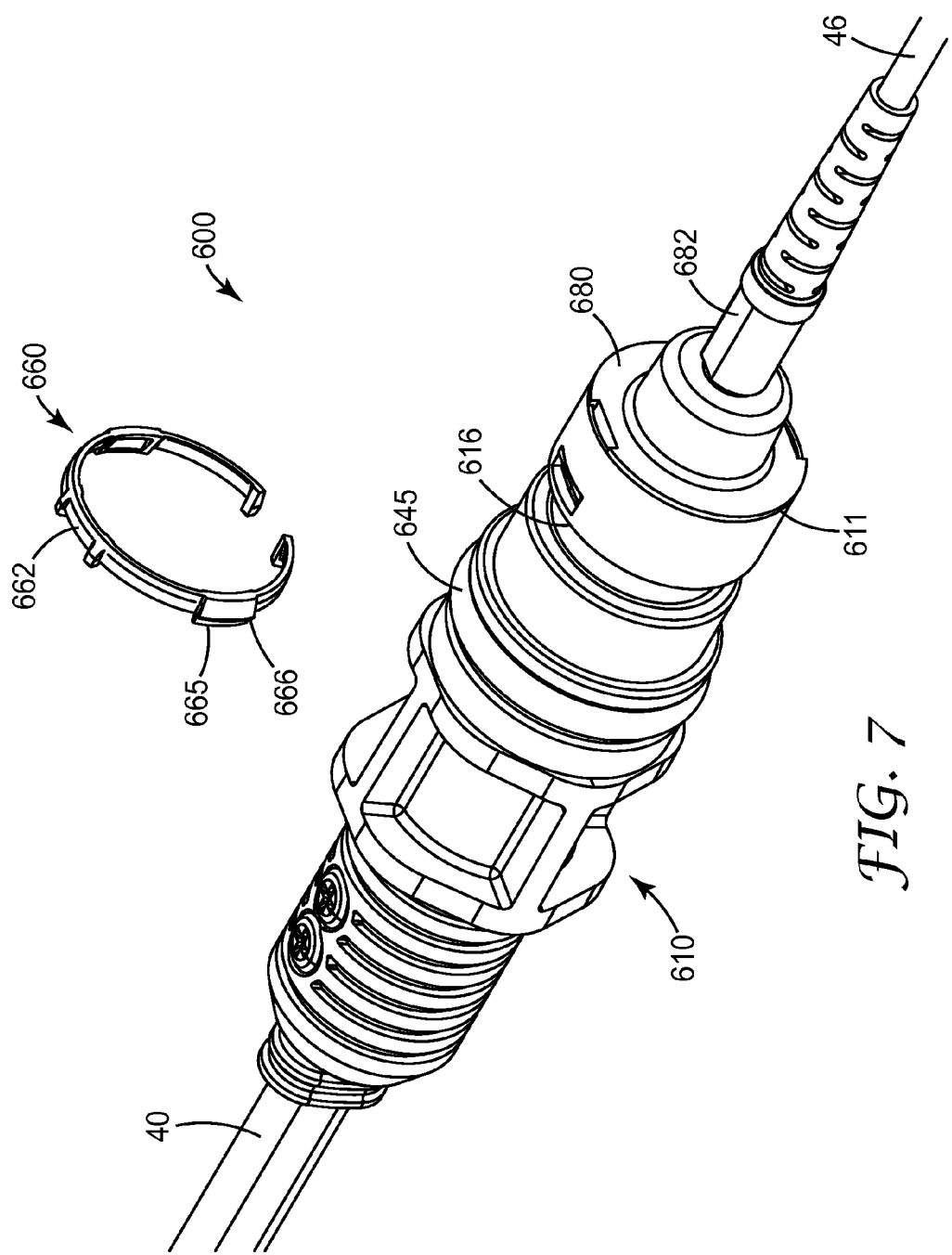
FIG. 7 is an isometric view showing another exemplary inlet device according to an aspect of the present invention.
Figure 8:
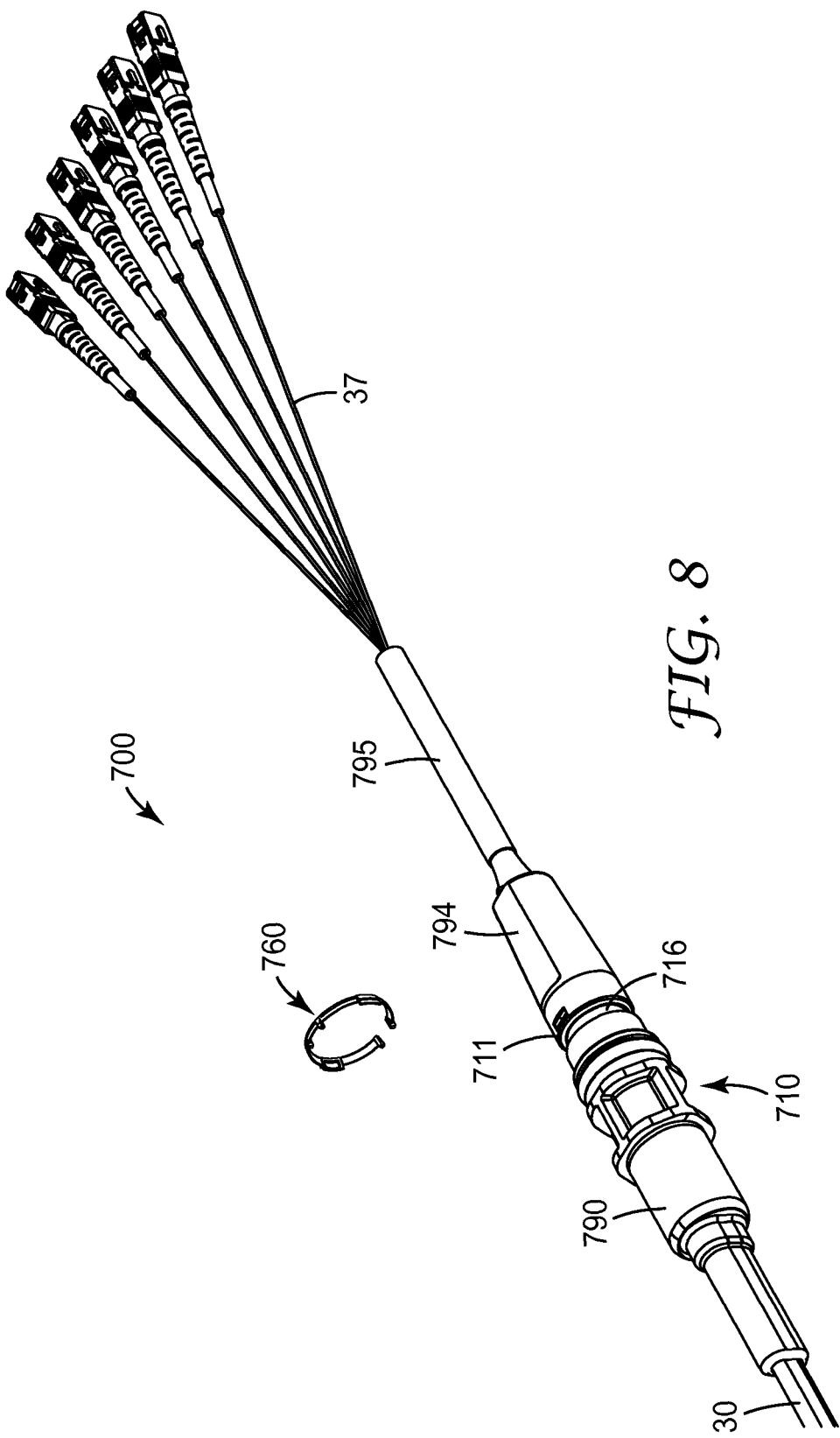
FIG. 8 is an isometric view showing another exemplary inlet device according to an aspect of the present invention.

FIGS. 7 and 8 show two additional embodiments of exemplary inlet devices 600, 700 respectively, that includes the novel retainer clip 660, 760 of the present invention. Inlet devices 600, 700 are similar to the inlet devices described in U.S. Pat. No. 7,738,759, which is incorporated by reference herein, in its entirety. An inlet device 600, 700 includes a housing 610, 710 with an internal strength member securing section configured to fasten at least one strength member in a securing well within the housing and a fiber guide device 680 (not shown in FIG. 8). The fiber guide device may be designed to accommodate single fiber cables (as shown in FIG. 7) or for multi-fiber cables as shown in FIG. 8.

An exemplary fiber guide devices are a single fiber orifice plate 680, a multi-fiber orifice plate or a multi fiber fan out device. In one aspect shown in FIG. 7, the housing can be a unibody structure that includes the strength member securing section, an annular groove to receive a sealing member 645 formed in the outer surface of the unibody structure, an annular channel 616 formed near the first end 611 in the external surface of housing 610 of the inlet device 600 that is configured to accept novel retainer clip 660, thus eliminating the need for a separate locking mechanism. The retainer clip 660 can have a broken ring-shape, as described previously, and includes a plurality of flared portions 665 disposed on band portion 662. The flared portions can be compressed during insertion of the inlet device when during insertion through the port and radially pushed outward due to the torsion spring forces of the band portions of the band on either side of each flared portions after the retainer clip has sufficiently cleared the port. The flared portions will engage with the edge of the port to lock the inlet device in place.

In an exemplary aspect, the flared portions 665 can extend angularly from the band of the retainer clip such that the distance between the bottom edges of flared portions disposed on opposite sides of the retainer clip is larger than the diameter of the portion of the inlet device housing that passes completely through the port and the exit opening of the port through which the first end of the inlet device emerges during installation of the inlet device into the port of a telecommunication enclosure. The flared portions can include a lip 666 that engages with an edge of a port in the telecommunication enclosure containing one or more ports to prevent extraction of the inlet device by application of a simple removal force.

FIG. 7 shows a drop cable assembly having inlet device 600 mounted on an end of an optical fiber drop cable 40. Inlet device 600 can be preassembled on the drop cable in the factory or can be field mounted. In this embodiment, inlet device 600 provides a protected transition between a relatively rigid drop cable 40 and the more flexible jacketed fiber 46. The inlet device can include a strain relief boot 682 attached to fiber guide 680 to ensure that the minimum bend radius of the flexible jacketed fiber 46 is not violated. In an exemplary aspect, flexible jacketed fiber 46 can be terminated with a conventional optical fiber connector.

FIG. 8 shows a drop cable assembly having inlet device 700 mounted on an end of a multi fiber cable 30. In this embodiment, inlet device 700 provides a protected transition between a sheathed multi fiber cable 30 and the optical fibers of the multi-fiber cable disposed in protective buffer tubes 37. The inlet device can include a cover 790 which protects the transition region which can include a multi-fiber guide device (not shown) or a multi-fiber fan out device (also not shown). A fiber strain relief member or boot 795 can be attached to the cover to ensure that the minimum bend radius of the individual fibers in the buffer tubes is not violated as they exit the inlet device. In an exemplary aspect, the individual fibers in the buffer tubes can be terminated with conventional optical fiber connectors as shown in FIG. 8.

In one aspect shown in FIG. 8, the housing 710 includes an annular channel 716 formed near the first end 711 in the external surface of housing of the inlet device 700 that is configured to accept novel retainer clip 760, thus eliminating the need for a separate locking mechanism. The retainer clip 760 can have a broken ring-shape, as described previously.

Strain relief of the cable entering the exemplary inlet devices 600, 700 can be provided by placing a shrinkable compression sleeve(s) 794 (FIG. 8, not shown in FIG. 7) over the second end of the exemplary inlet devices 600, 700. The shrinkable compression sleeve(s) can be one of a regular heat shrink sleeve, an adhesive coated heat shrink sleeve or a cold shrink sleeve.

Figure 9A:
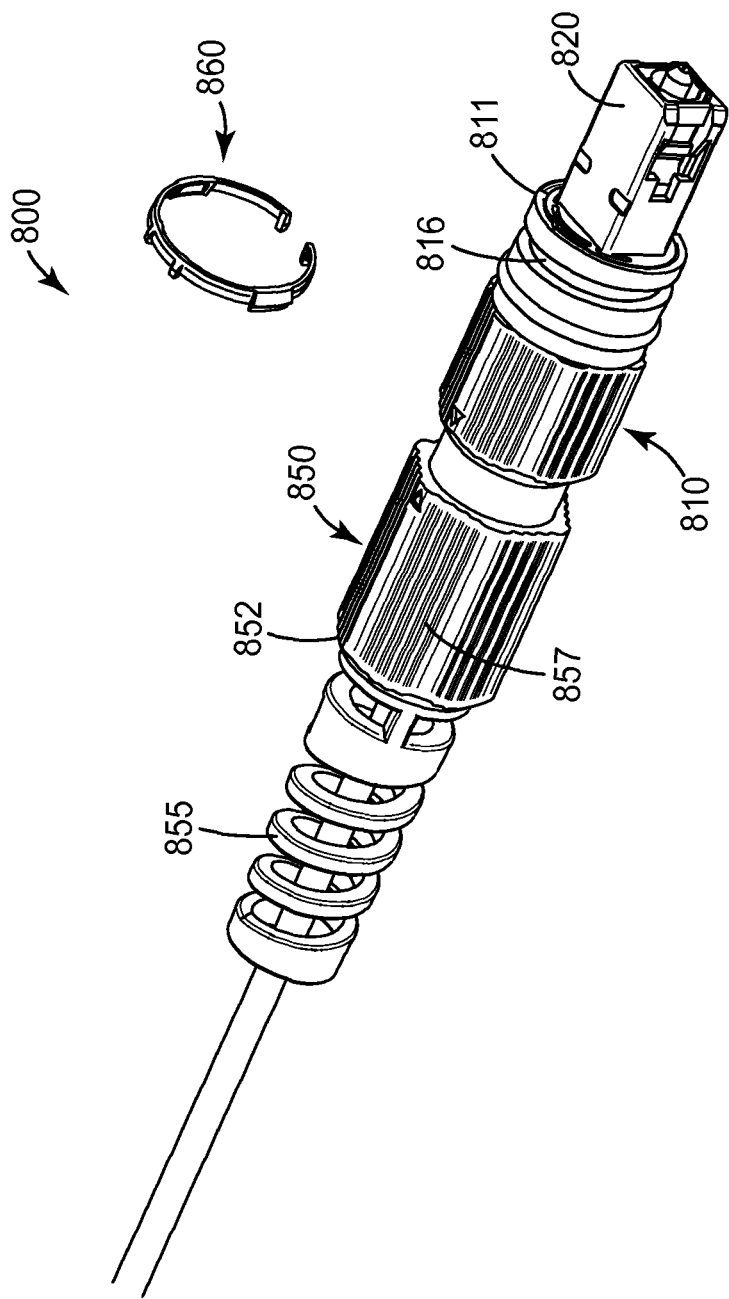
FIGS. 9A-9B are two views showing yet another exemplary inlet device according to an aspect of the present invention.
Figure 9B:
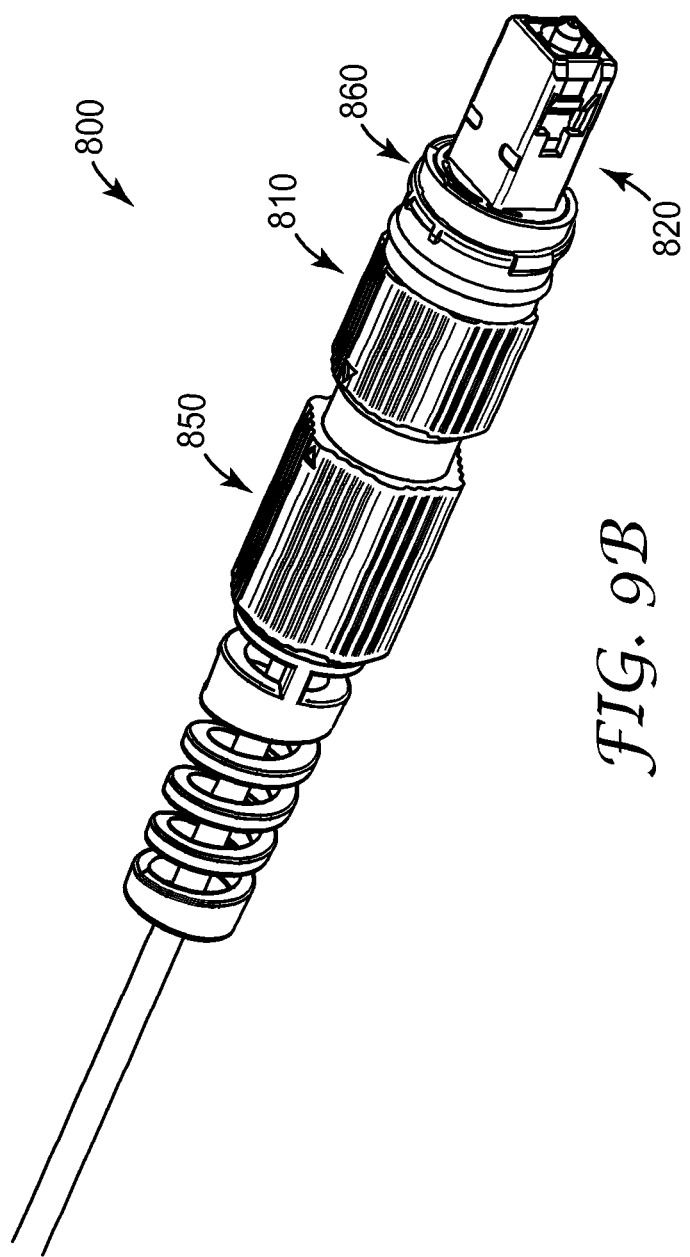

FIGS. 9A and 9B show another exemplary embodiment of exemplary inlet device 800 that includes the novel retainer clip 860 of the present invention. Inlet device 800 is similar to the inlet devices described in U.S. Provisional Patent Application No. 61/718,979, which is incorporated by reference herein, in its entirety. Inlet device 800 is provided with a standard optical fiber connector interface that can be plugged into a standard optical connector adapter through a port of the telecommunication enclosure. The connector interface can include one of an SC, MT, MPO, ST, FC, and LC connector formats.

Inlet device 800 includes a main body 810 having a first end 811 and a second end (not visible in FIGS. 9A-9B), a compression member 850 attachable to the second end of the main body and an optical interface or outer housing portion 820 attachable to the first end of the main body. The compression member applies a radial force to the second end of the optical fiber connector's main body. Inlet device 800 may be formed of plastic by conventional methods, for example by injection molding.

Inlet device 800 includes an optical connection portion (not shown) disposed within the main body 810 that mates with the optical interface portion 820. The optical connection portion can be a portion of a factory mounted connector (including the ferrule collar body and backbone) or can be a field mounted connector such as is described in commonly owned U.S. Patent Publication No. 2011/0044588, incorporated herein by reference in its entirety.

Again, inlet device 800 includes an annular channel 816 formed near the first end 811 in the external surface of housing of the inlet device that is configured to accept novel retainer clip 860, thus eliminating the need for a separate locking mechanism. The retainer clip 860 can have a broken ring-shape, as described previously.

Compression member 850 has an interior chamber having an internal threaded portion that corresponds and can be mated to an external thread (not shown) on the second end of the housing to allow the compression member to be secured to the main body of the inlet device. In addition, compression member 850 can have a gripping surface 857 on its external surface that corresponds to the position of the internal threaded portion within the compression member. The external gripping surface may be a hexagonally shaped cross-section to facilitate gripping of the cable securing device with a tool or by hand. In the exemplary aspect shown in FIGS. 9A and 9B, compression member 850 can include an integral bend control boot 855 disposed on the second end 852 of the compression member. The bend control boot prevents the telecommunication cable from exceeding its minimum bend radius which could result in degradation of the signal being carried on the telecommunication cable.

The inlet devices embodiments described above provide a simple and user-friendly design thereby greatly facilitating the installation of the last leg of the FTTH or FTTA network to the end user.

Various modifications including extending the use of the inlet device to applications with copper telecommunication cables or copper coax cables, equivalent processes, as well as numerous structures to which the present invention may be applicable will be readily apparent to those of skill in the art to which the present invention is directed upon review of the present specification.

We claim:

1. An inlet device to be fitted to a communication cable, the device comprising:
   a housing having a first end and a second end, wherein the housing includes a compressible portion at the second end of the housing and a retainer clip disposed in a channel adjacent to the first end of the housing to secure the inlet device in a close fitting port of a telecommunication enclosure; and
   a compression member,
   wherein the retainer clip comprises a generally C-shaped band, and wherein the retainer clip has at least two flared portions disposed on opposite sides of the retainer clip and extending from the C-shaped band.

2. The inlet device of claim 1, wherein the compressible portion of the housing comprises a plurality of spaced apart fingers.

3. The inlet device of claim 1, wherein the compression member comprises a clamping nut and wherein the compression member is fitted over the compressible portion of the housing to cause the compressible portion to conform to an outer surface of the communication cable fitted in the inlet device.

4. The inlet device of claim 1, further comprising an internal sealing member that is at least partially inserted into the second end of the inlet device.

5. The inlet device of claim 4, wherein the compression member comprises a clamping nut and wherein the compression member is fitted over the compressible portion of the housing to cause the compressible portion to conform to an outer surface of at least a portion of the internal sealing member.

6. The inlet device of claim 1, wherein the at least two flange portions are oriented at an acute angle relative to the centerline of the inlet device.

7. The inlet device of claim 1, wherein sections of the C-shaped band on either side of the flared portion act as torsion springs when the flared portions are radially depressed.

8. The inlet device of claim 1, further comprising a fiber guide device attached to the first end of the housing.

9. The inlet device of claim 1, further comprising an optical interface portion attached to the first end of the housing.

10. The inlet device of claim 1, further comprising a cable retention device attached to the first end of the housing.

11. An inlet device to be fitted to a communication cable, the device comprising:
- a housing having a first end and a second end, wherein the housing includes a compressible portion at the second end of the housing and a retainer clip disposed in a channel adjacent to the first end of the housing to secure the inlet device in a close fitting port of a telecommunication enclosure; and
- a compression member,
- wherein the retainer clip comprises a generally C-shaped band, and wherein the retainer clip includes a plurality of anchor portions spaced apart around the C-shaped band to position the retainer clip in the channel.

12. The inlet device of claim 11, wherein the retainer clip has at least two flared portions disposed on opposite sides of the retainer clip and extending from the clip.

13. The inlet device of claim 12, wherein sections of the band between the at least two flared portions and an anchor portion disposed on either side of each flared portion act as torsion springs when the flared portions are radially depressed.

14. The inlet device of claim 11, wherein the C-shaped band is disposed at an acute angle relative to the anchor portions.

15. An inlet device to be fitted to a communication cable, the device comprising:
- a housing having a first end and a second end, wherein a retainer clip is disposed in a channel adjacent to the first end of the housing to secure the inlet device in a close fitting port of a telecommunication enclosure, and
- a compressive sleeve attached to the second end of the housing,
- wherein the retainer clip comprises a generally C-shaped band, and wherein the retainer clip has at least two flared portions disposed on opposite sides of the retainer clip and extending from the clip and wherein the flange portions are oriented at an acute angle relative to a centerline of the inlet device.

16. The inlet device of claim 15, wherein sections of the band on either side of the at least flared portion act as torsion springs when the flared portions are radially depressed.

* * * * *